United States Patent
Gronitzki

(10) Patent No.: US 10,648,567 B2
(45) Date of Patent: May 12, 2020

(54) SEAL RINGS AND METHODS FOR MAKING THEM

(71) Applicant: Saint-Gobain Performance Plastics L+S GMBH, Wertheim (DE)

(72) Inventor: Mirco Gronitzki, Wertheim (DE)

(73) Assignee: SAINT-GOBAIN PERFORMANCE PLASTICS L+S GMBH, Wertheim (DE)

( * ) Notice: Subject to any disclaimer, the term of this patent is extended or adjusted under 35 U.S.C. 154(b) by 32 days.

(21) Appl. No.: 15/866,190

(22) Filed: Jan. 9, 2018

(65) Prior Publication Data

US 2018/0195616 A1     Jul. 12, 2018

Related U.S. Application Data

(60) Provisional application No. 62/444,782, filed on Jan. 10, 2017.

(51) Int. Cl.
*F16J 15/328* (2016.01)
*F16J 9/14* (2006.01)
(Continued)

(52) U.S. Cl.
CPC ........... *F16J 15/328* (2013.01); *F16J 9/14* (2013.01); *F16J 15/441* (2013.01); *B29D 99/0053* (2013.01)

(58) Field of Classification Search
CPC .......... F16J 15/328; F16J 15/441; F16J 15/44; F16J 15/442; F16J 9/14
See application file for complete search history.

(56) References Cited

U.S. PATENT DOCUMENTS 2,485,862 A * 10/1949 Caza .................. F16J 9/14
                                                        277/496
3,614,183 A    10/1971 Berens
(Continued)

FOREIGN PATENT DOCUMENTS

DE    102007034418 A1    1/2009
EP       0783082 A1    7/1997
(Continued)

OTHER PUBLICATIONS

Kakehi et al., "Development of Low Torque Seal Ring for Automotive Transmission," NTN Technical Review No. 81, 68-73 (2013).
(Continued)

*Primary Examiner* — Gilbert Y Lee
(74) *Attorney, Agent, or Firm* — McDonnell Boehnen Hulbert & Berghoff LLP

(57) ABSTRACT

The present disclosure relates generally to seal rings useful in rotating systems such as automobile transmissions, torque converters and automatic clutches. In one embodiment, the disclosure provides a seal ring in which the first end includes a platform in a radially inward portion of each lateral region thereof, and a vertically-extending blade in a radially outward portion of its central region; and the second end of the seal ring has two vertically extending fingers in a radially outward portion of each lateral region thereof, and a platform in a radially inward portion of its central region. When the ends are engaged, a portion of the extension of the blade is disposed radially directly over the central platform, a portion of each finger is disposed radially directly over a lateral platform, and the blade of the central region of the first end is disposed between the fingers.

22 Claims, 11 Drawing Sheets

(51) Int. Cl.
*F16J 15/44* (2006.01)
*B29D 99/00* (2010.01)

(56) References Cited

U.S. PATENT DOCUMENTS

| | | | |
|---|---|---|---|
| 5,303,936 A | 4/1994 | Kuroki | |
| 5,403,536 A | 4/1995 | Hanyuda | |
| 5,628,519 A | 5/1997 | Kakehi | |
| 5,673,923 A | 10/1997 | Watanabe | |
| 5,882,012 A | 3/1999 | Niwa | |
| 5,934,680 A | 8/1999 | Kakehi | |
| 6,189,896 B1 | 2/2001 | Dickey | |
| 6,257,202 B1 | 7/2001 | Ohta | |
| 6,349,943 B1 | 2/2002 | Ishii | |
| 6,468,068 B1 | 10/2002 | Abe | |
| 6,884,827 B2 | 4/2005 | Ota | |
| 7,341,256 B2 | 3/2008 | Nakaoka | |
| 7,766,339 B2 | 8/2010 | Umetsu | |
| 8,028,997 B2 | 10/2011 | Shimazu | |
| 9,239,113 B2 | 1/2016 | Nagai | |
| 10,309,539 B2 | 6/2019 | Kakehi | |
| 2002/0001182 A1 | 1/2002 | Stark | |
| 2002/0158424 A1 | 10/2002 | Yanagiguchi | |
| 2003/0122318 A1 | 7/2003 | Yanagiguchi | |
| 2004/0251634 A1 | 12/2004 | Shimazu | |
| 2005/0116426 A1* | 6/2005 | Watanabe | F16J 9/14 |
| | | | 277/419 |
| 2006/0038355 A1* | 2/2006 | Nakaoka | F16J 15/441 |
| | | | 277/495 |
| 2006/0178267 A1 | 8/2006 | Kim | |
| 2008/0011551 A1 | 1/2008 | Inazuka | |
| 2009/0051117 A1 | 2/2009 | Crudgington | |
| 2009/0194948 A1* | 8/2009 | Wirt | F16J 9/14 |
| | | | 277/345 |
| 2009/0212502 A1 | 8/2009 | Bordenet | |
| 2012/0112415 A1* | 5/2012 | Benjamin | F01D 11/003 |
| | | | 277/303 |
| 2015/0086802 A1 | 3/2015 | Maeda | |
| 2015/0115542 A1* | 4/2015 | Neumann | F16J 15/16 |
| | | | 277/546 |
| 2016/0116066 A1* | 4/2016 | Watanabe | F16J 9/14 |
| | | | 277/500 |
| 2016/0186862 A1 | 6/2016 | Kondou | |
| 2017/0107865 A1 | 4/2017 | Yasuda | |
| 2018/0231127 A1 | 8/2018 | Kakehi | |
| 2018/0258889 A1* | 9/2018 | Ishigaki | F02M 26/70 |

FOREIGN PATENT DOCUMENTS

| | | |
|---|---|---|
| EP | 1445518 A1 | 8/2004 |
| FR | 1351829 A | 2/1964 |
| JP | H0875007 A | 3/1996 |
| JP | H08233110 A | 9/1996 |
| JP | H08276508 A | 10/1996 |
| JP | H0989111 A | 3/1997 |
| JP | H0994851 A | 4/1997 |
| JP | H0996363 A | 4/1997 |
| JP | 2001004032 A | 1/2001 |
| JP | 2003035367 A | 2/2003 |
| WO | 9402762 | 2/1994 |
| WO | 9804853 A1 | 2/1998 |
| WO | 2006001281 A1 | 1/2006 |
| WO | 2016014585 A1 | 1/2016 |

OTHER PUBLICATIONS

International Search Report and Written Opinion in PCT/IB2018/000054, dated Apr. 12, 2018.

* cited by examiner

SEAL RINGS AND METHODS FOR MAKING THEM

CROSS-REFERENCE TO RELATED APPLICATIONS

The present application claims the benefit of priority of U.S. Provisional Patent Application No. 62/444,782, filed Jan. 10, 2018, which is hereby incorporated herein by reference in its entirety.

BACKGROUND OF THE DISCLOSURE

1. Field of the Disclosure

The present disclosure relates generally to components useful in rotating systems such as automobile transmissions, torque converters and automatic clutches. The present disclosure relates more particularly to seal rings useful in rotating systems such as oil-lubricated systems and pneumatic systems, and methods for making such seal rings.

2. Technical Background

Seal rings are commonly used in assemblies like transmissions and clutches to limit fluid leakage and pressure loss, especially in parts of the assemblies under high pressure. These are typically used in rotating connections in conjunction with a liquid such as an oil or other lubricant.

An example of a conventional rotating connection is shown in perspective schematic view in FIG. 1. Here, a seal ring is disposed about a rotating shaft at a joint thereof, in a groove such that it seals against the surrounding housing. The seal ring is fixed neither to the shaft nor the housing, so that it can rotate with respect to either or both. The seal ring itself has three sealing faces, as shown in the cross-sectional schematic view of FIG. 2. The outer circumferential face of the seal ring seals against the housing in which the shaft and seal ring are disposed. One of the lateral faces seals against the sidewall of a groove formed in the shaft. In many cases, only one of the lateral faces is actually sealed against a surface when installed. Nonetheless, seal rings are typically made to be symmetric, so that they can be installed without regard to which direction they face. Accordingly, a seal ring needs to have three faces that are sufficiently flat and circular to seal against a cooperating surface (i.e., of a groove or of a housing).

Seal rings typically have two ends that can engage with one another to provide an overall circular seal in operation, but can be disengaged to allow a seal ring to be slipped over an already-installed shaft, e.g., of a transmission. As the person of ordinary skill in the art will appreciate, the first end and the second end of a ring seal can engage one another in various manners. It is desirable that the ends can move relative to one another, e.g., to slightly expand or contract the circumference of the circular seal, in order to accommodate different tolerances and expansions. For example, FIG. 3 provides partial perspective schematic views of a number of conventional examples of engageable first and second ends for seal rings including a butt joint, a hook joint, a bias joint, a 2-L joint, and a 2-T joint.

It is important for a seal ring to remain in a substantially circular configuration, both with respect to radial deformations and with respect to planar deformations. Any significant out-of-roundness can cause a seal ring to fail to provide a sufficient seal, and thus cause an assembly including such an out-of-round seal ring to fail. And deformations in a seal can cause the seal to be damaged when being installed, especially at its ends, which can cause critical failures with respect to fluid leakage.

SUMMARY OF THE DISCLOSURE

In one aspect, the present disclosure provides a seal ring comprising a circular ring body extending between a first end and a second end engageable with the first end, the circular ring body comprising
- an inner circumferential face;
- an outer circumferential face opposing the inner circumferential face having a first lateral edge and an opposed second lateral edge;
- a first lateral face extending between the inner circumferential face and the opposing outer circumferential face; and
- a second lateral face opposing the first lateral face, disposed between the inner circumferential face and the opposing outer circumferential face;

wherein
- the first end including a central region and two lateral regions, one on each lateral side of the central region, and the second end of the seal ring includes a central region and two lateral regions, one on each lateral side of the central region, such that when the first end is engaged with the second end to provide a circular ring seal, the central region of the first end is laterally aligned with the central region of the second end;
- the first end includes a platform in a radially inward portion of each of the lateral regions thereof, and a vertically-extending blade in a radially outward portion of the central region thereof, the blade extending circumferentially beyond the platforms, forming an extension of the blade; and
- the second end including two vertically extending fingers in a radially outward portion of each lateral region thereof, and a platform in a radially inward portion of the central region thereof, the platform extending circumferentially beyond the base of the fingers and being accessible from a radial outward side of the central region of the second end; and wherein when the first end is engaged with the second end,
- at least a portion of the extension of the blade of the central region of the first end that extends beyond the platforms of the lateral regions of the first end is disposed radially directly over the platform of the central region of the second end,
- at least a portion of each of the fingers of the lateral regions of the second end is disposed radially directly over a platform of a lateral region of the first end,
- and the blade of the central region of the first end is disposed between the fingers of the lateral regions of the second end.

In another aspect, the present disclosure provides a method for making a seal ring as disclosed herein, the method including
- providing a mold having a cavity, the cavity having a shape that is the inverse of the shape of the seal ring, with an injection molding gate coupled to the cavity;
- injecting molten polymer into the cavity through the gate;
- allowing the polymer to harden; and
- removing the seal ring from the mold and detaching it from a polymer runner at a surface of the seal ring.

Another aspect of the disclosure is an apparatus that includes
a rotating shaft;
a seal ring as described herein disposed about the rotating shaft, with its first lateral face and/or its second lateral face disposed against a sidewall of a groove associated with the rotating shaft; and
a housing or a bore disposed about the shaft and the seal ring, such that the outer circumferential face of the seal ring is disposed against an inner circumferential face of the housing or bore.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present inventor has noted that the conventional 2-T joint provides the best leakage performance among conventional types of engagements between a first end and a second end of a ring seal.

Figure 4:
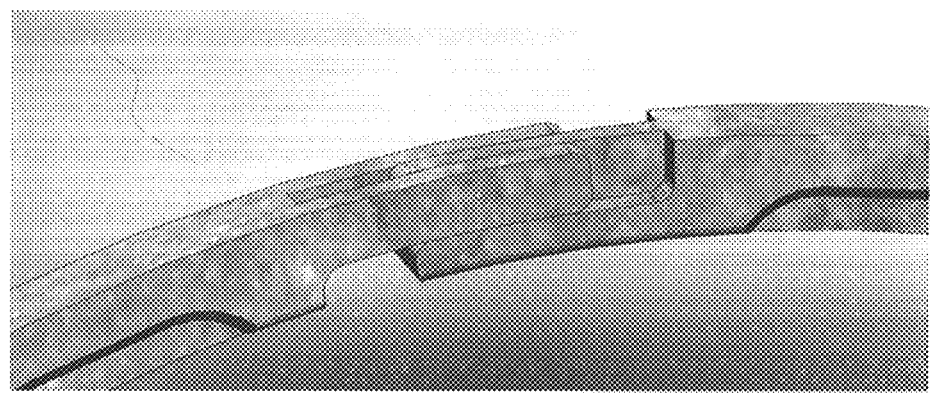
FIG. 4 is a schematic perspective view of an example of a conventional 2-T joint.
Figure 5:
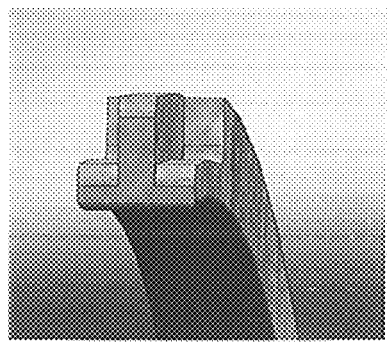
FIG. 5 is schematic perspective end view and FIG. 6 is a schematic perspective top view of the 2-T joint of FIG. 4.
Figure 6:
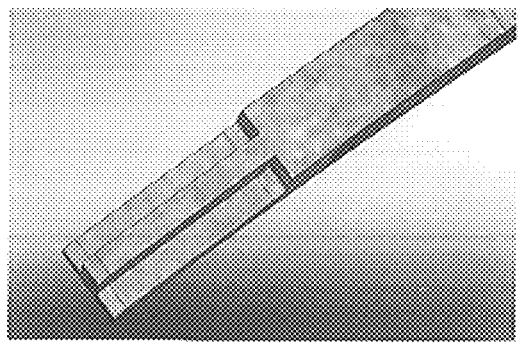
Figure 7:
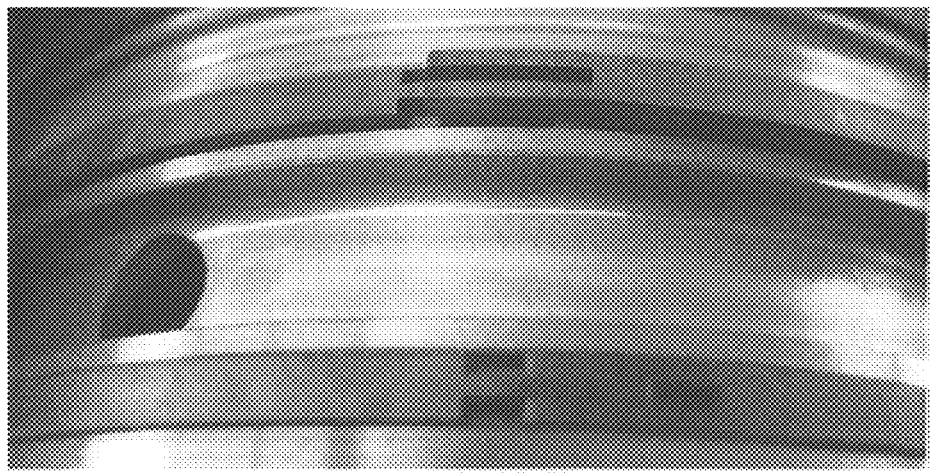
FIG. 7 is a schematic perspective view.

A schematic perspective view of an example of a conventional 2-T joint is provided as FIG. 4; a schematic perspective end view and a schematic perspective top view of a first end of the conventional 2-T joint are provided respectively as FIGS. 5 and 6. Without intending to be bound by theory, the inventor surmises that this is due in large measure to the fact the 2-T geometry prevents significant planar deformation as a result of the fact that the central blade of the first end of the seal ring is held between the lateral fingers of the second end of the seal ring. The gap between the ends is less significantly affected by thermal expansion in the circumferential direction than it is in other designs. The 2-T geometry allows for overlap of the ends with a minimal finger length, leading to decreased fluid leakage rates through and above the gap. However, the present inventor has noted a significant issue with the 2-T geometry: radial deformation of the seal ring can cause significant persistent out-of-roundness. For example, while seal rings are generally elastically deformable so that they can be opened to be installed around a shaft, if they are deformed for a long period of time they can plastically deform so that they do not snap back into round. This can be caused by improper physical protection during shipment. And that radial deformation is not blocked by the conventional 2-T design; while the lateral fingers of the second end of the seal ring are blocked from moving radially inward with respect to the first end of the seal ring the by the lateral shelves of the first end, they are not blocked from moving radially outward with respect to the first end. FIG. 7 is a photograph of two conventional 2-T seal rings installed on a shaft. The lower seal ring is acceptably round. But the upper seal ring is significantly out-of-round, caused by a plastic radial deformation during shipping. Accordingly, while the first end (i.e. on the left) of the seal ring is disposed against the shaft, the second end (i.e., on the right) is lifted away from the shaft as a result of the seal ring being substantially non-circular.

To overcome these disadvantages and provide the necessary sealing performance, the present disclosure provides seal rings in which the ends are blocked not only from deforming laterally out-of-plane with respect to one another, but also from deforming radially with respect to one another.

Figure 8:
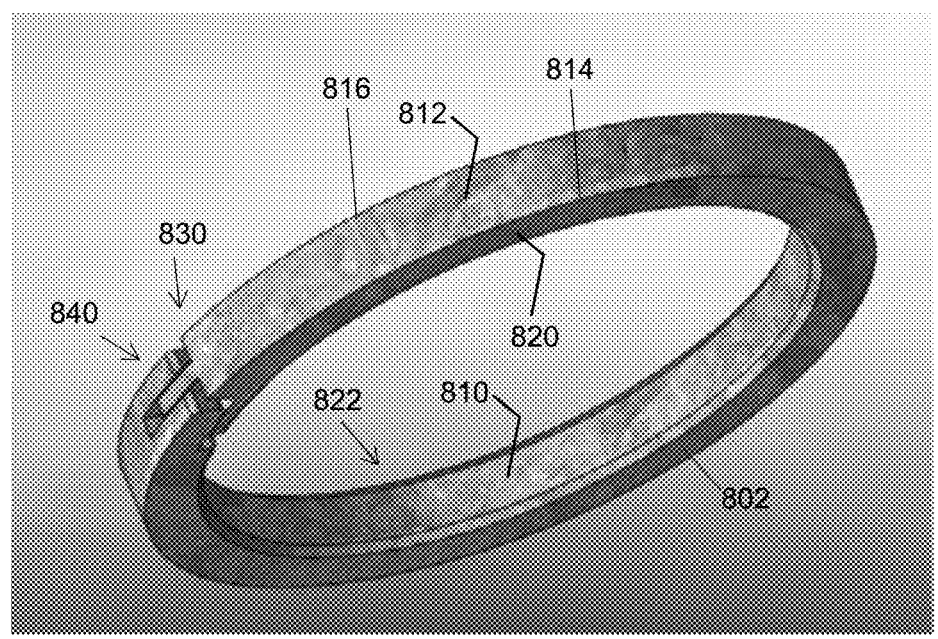
FIG. 8 is a partial schematic perspective view of a seal ring according to various embodiments of the disclosure.

Accordingly, one aspect of the disclosure is a seal ring. An example of such a seal ring is shown in schematic perspective view in FIG. 8. Seal ring 800 has a circular ring body 802 extending between a first end 830 and a second end 840. As will be discussed in more detail below, second end 840 is engageable with first end 830, such that the ends of the seal ring can be pulled apart to be placed around a shaft, but provide a circular outer circumference when they are allowed to flex back together, and such that the ends are blocked from moving not only laterally but also radially with respect to one another. The circular ring body is defined in part by an inner circumferential face 810 and an outer circumferential face 812, opposing the inner circumferential face. The outer circumferential face 812 has a first lateral edge 814 and an opposed second lateral edge 816. Extending between the inner circumferential face 810 and the outer circumferential face 812 are a first lateral face 820 and a second lateral face 822 opposing the first lateral face 820.

Figure 9:
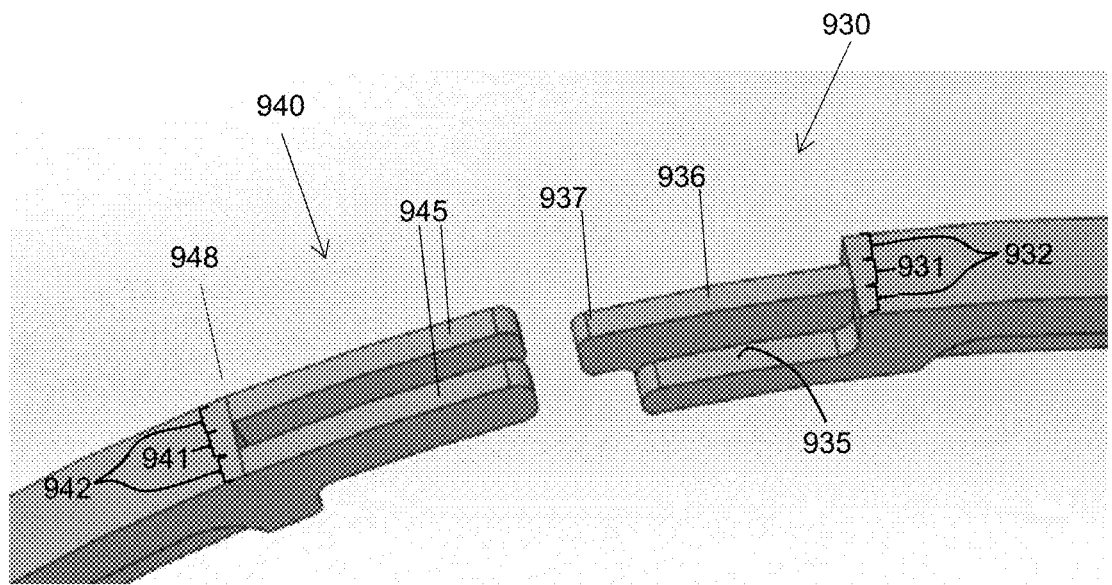
FIG. 9 is an exploded schematic perspective view.
Figure 10:
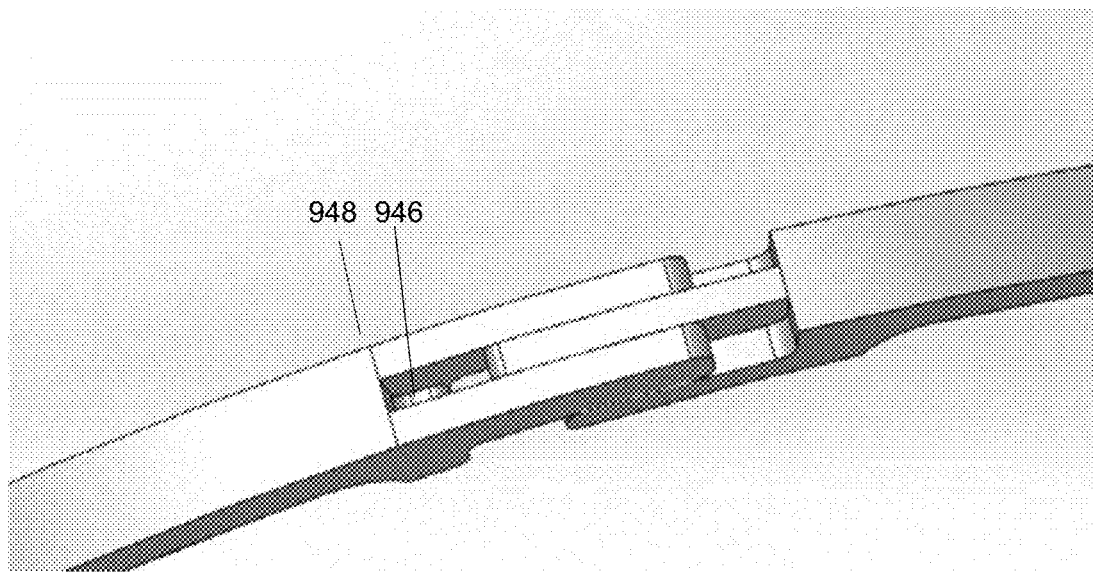
FIG. 10 is a partially engaged schematic perspective view of a seal ring according to one embodiment of the disclosure.
Figure 11:
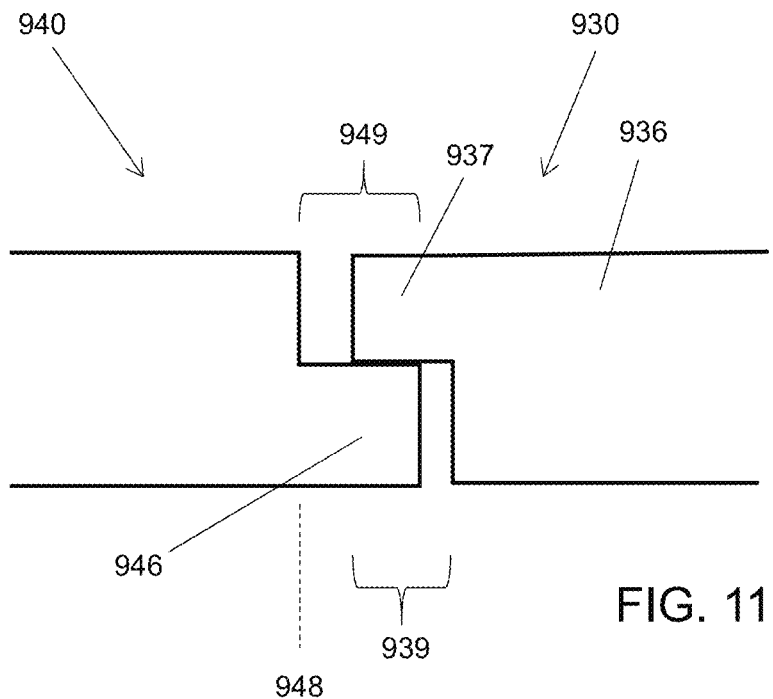
FIG. 11 is a partial schematic cross-sectional view along a lateral region of a ring seal of FIGS. 9 and 10.
Figure 12:
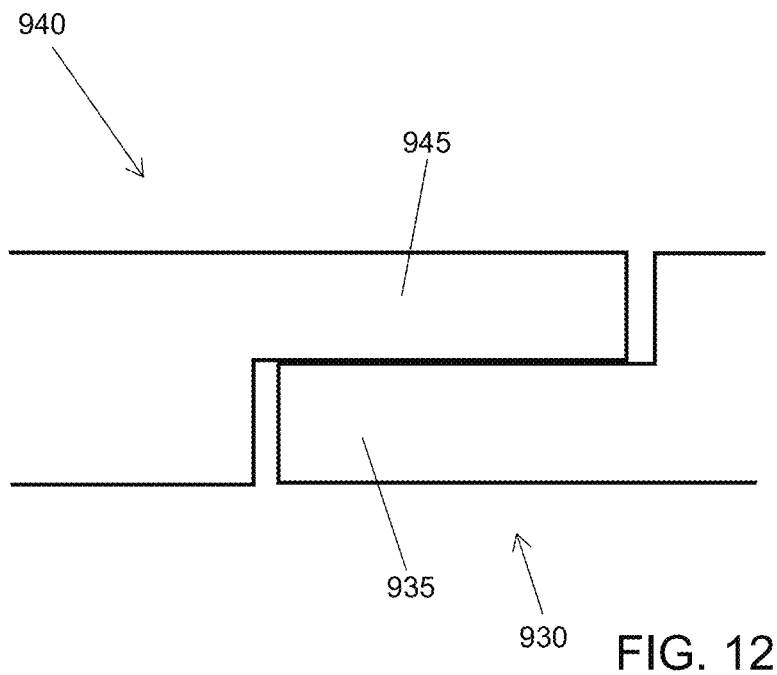
FIG. 12 is a partial schematic view of cross-sectional view along a central region of a ring seal of FIGS. 9 and 10.

Notably, the first end and the second end of the seal ring are configured such that, when engaged with one another to form a circular seal ring, the ends are blocked from moving not only laterally but also radially with respect to one another. One embodiment of a seal ring according to the disclosure is shown in exploded schematic perspective view in FIG. 9, and in a partially engaged schematic perspective view in FIG. 10. FIG. 11 is a partial schematic cross-sectional view along a lateral region of a ring seal of FIGS. 9 and 10, and FIG. 12 is a partial schematic view of cross-sectional view along a central region of a ring seal of FIGS. 9 and 10. The first end 930 of the seal ring includes a central region 931 and two lateral regions 932, one on each side of the central region 931. Similarly, the second end 940 of the seal ring includes a central region 941 and two lateral regions 942, one on each side of the central region 941. When the first end is engaged with the second end to provide a circular ring seal, the central region of the first end is laterally aligned with the central region of the second end. The first end 930 includes a platform 935 in a radially inward portion 933 of each of the lateral regions 932 thereof. The first end also includes a vertically-extending blade 936 in a radially outward portion 934 of the central region 931 thereof. Notably, instead of being flush with the platforms as in the conventional 2-T joint, the blade 936 extends circumferentially beyond the platforms 935, forming an extension 937 of the blade 936. The second end 940 of the seal ring has two vertically extending fingers 945 in a radially outward portion 944 of each lateral region 942 thereof. The second end 940 of the seal ring also has a platform 946 in a radially inward portion 943 of the central region 941 thereof, the platform extending circumferentially beyond the base 948 of the fingers 945 and being accessible from a radial outward side of the central region of the second end.

When the first end is engaged with the second end, at least a portion of the extension 937 of the blade 936 of the central region of the first end that extends beyond the platforms of the lateral regions of the first end is disposed radially directly over the platform 946 of the central region of the second end. This blocks the first end from moving radially inward with respect to the second end, and blocks the second end from moving radially outward with respect to the first end. Similarly, at least a portion of the fingers 945 of the lateral regions of the second end are disposed radially directly over a platform 935 of a lateral region of the first end. This blocks the first end from moving radially outward with respect to the second end, and blocks the second end from moving radially inward with respect to the first end. Finally, the blade 936 of the central region of the first end is disposed between the fingers 945 of the lateral regions of the second end. This blocks the first end and the second end from moving laterally with respect to one another.

In certain desirable embodiments of the seal rings as otherwise described herein, the first end is engaged with the second end such that the ends are blocked from moving radially inward with respect to one another when the seal ring is packaged for shipment. This can allow the seal ring to be protected from harmful deformations during shipment, so that it is in an undeformed state when installed. In certain embodiments of the seal rings as otherwise described herein, the first end is engaged with the second end such that the ends are blocked from moving radially inward with respect to one another when the seal ring is installed around a shaft.

In certain embodiments of the seal rings as otherwise described herein, and as shown in FIGS. 9-12, the platform of the second end is formed as a substantially horizontal (i.e., with respect to a tangent of the circular seal) platform, with the radially inward face of the extension of the blade of the first end having a substantially horizontal mating surface.

But in other embodiments, the platform of the second end and the radially inward face of the extension of the blade of the first end are formed on a slanted angle. For example, in certain embodiments of the seal rings as otherwise described herein, the platform of the second end and the radially inward face of the extension of the blade of the first end are formed at an angle that is no more than 75 degrees from horizontal. For example, in certain such embodiments, the platform of the of the second end and the radially inward face of the extension of the blade of the first end are formed at an angle that is no more than 60 degrees from horizontal, no more than 45 degrees from horizontal, or no more than 30 degrees from horizontal, or 10-75 degrees, or 10-60 degrees, or 10-45 degrees, or 10-30 degrees, or 30-75 degrees, or 30-60 degrees, or 45-75 degrees, or 45-60 degrees from horizontal. While the strength of the blocking decreases as the angle increases, in many situations an angled configuration can be more than sufficient to provide the necessary level of blocking of radial deformation.

Figure 13:
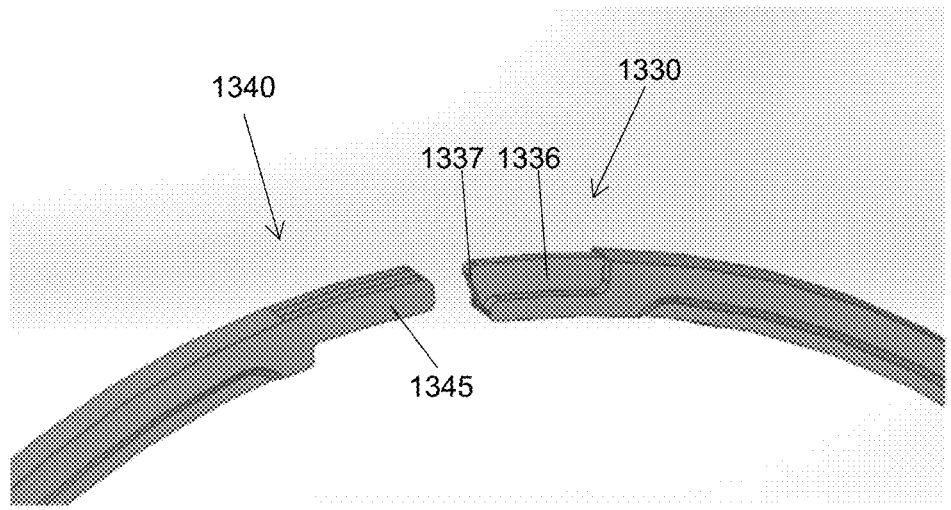
FIG. 13 is an exploded side schematic perspective view.
Figure 14:
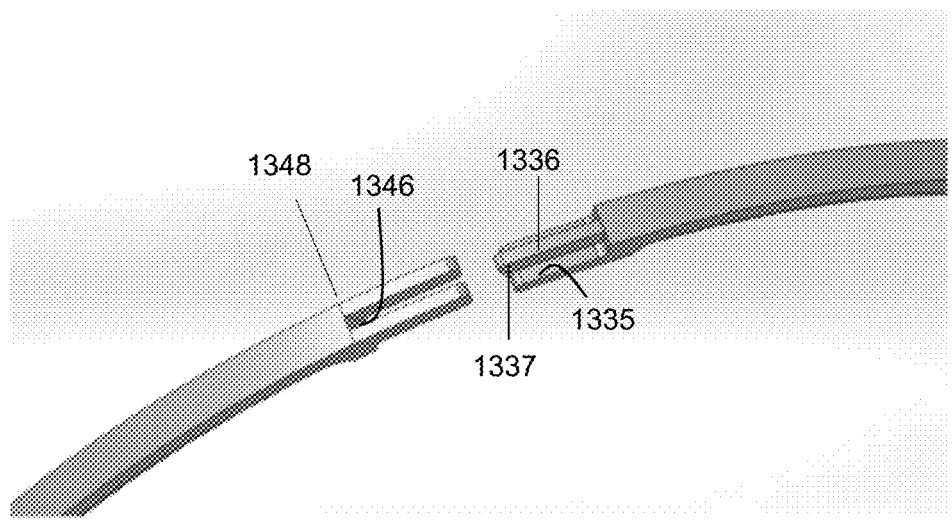
FIG. 14 is an exploded top schematic perspective view.
Figure 15:
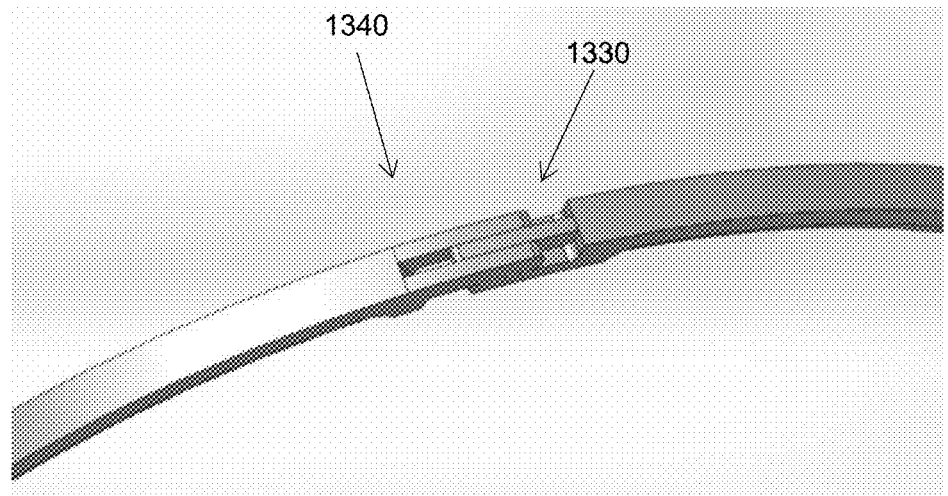
FIG. 15 is a partially engaged schematic perspective view of a seal ring according to another embodiment of the disclosure.
Figure 16:
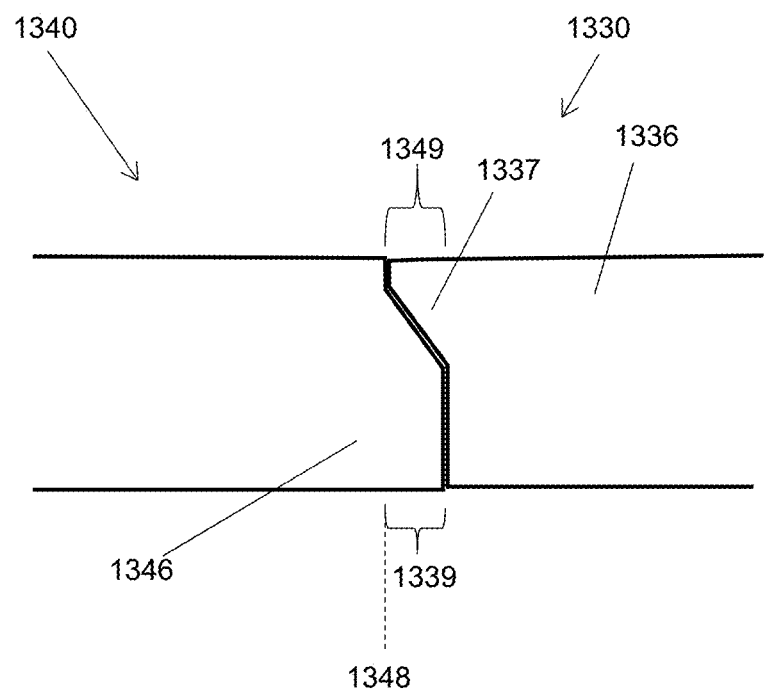
FIG. 16 is a partial schematic cross-sectional view along a lateral region of a ring seal of FIGS. 13-15.
Figure 17:
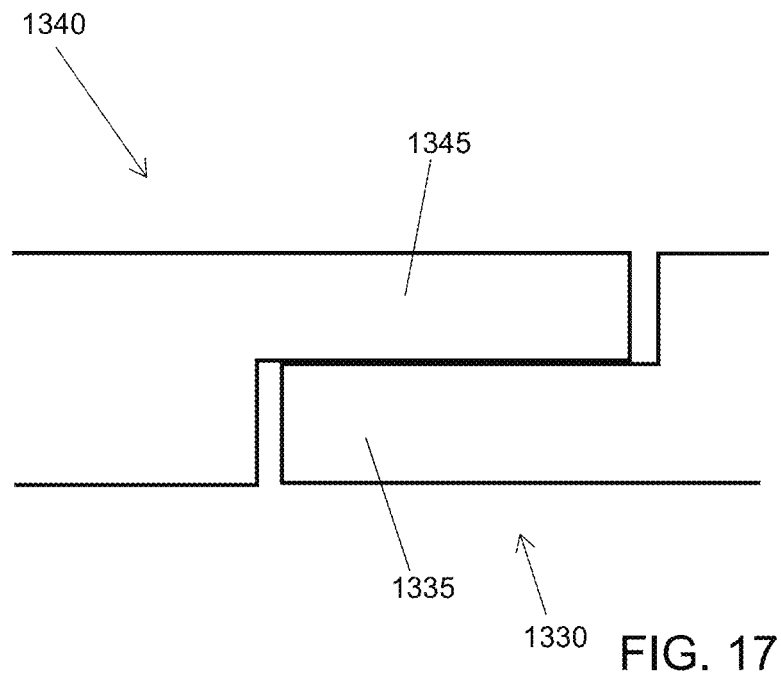
FIG. 17 is a partial schematic view of cross-sectional view along a central region of a ring seal of FIGS. 13-15.

Another embodiment of a seal ring according to the disclosure is shown in exploded schematic perspective view in FIGS. 13 (side schematic perspective view) and 14 (top schematic perspective view), and in a partially engaged schematic perspective view in FIG. 15. FIG. 16 is a partial schematic cross-sectional view along a lateral region of a ring seal of FIGS. 13-15, and FIG. 17 is a partial schematic view of cross-sectional view along a central region of a ring seal of FIGS. 13-15. The first end 1330 includes platforms 1335 in a radially inward portion of each of the lateral regions thereof. The first end also includes a vertically-extending blade 1336 in a radially outward portion of the central region thereof. Notably, instead of being flush with the platform as in the conventional 2-T joint, the blade 1336 extends circumferentially beyond the platforms 1335, forming an extension 1337 of the blade. Here, the extension of the blade is not formed by a separate shoulder of material as in the embodiment of FIGS. 9-12, but rather by the extension of the overall slanted shape of the blade. The second end 1340 of the seal ring has two vertically extending fingers 1345, one in a radially outward portion of each lateral region thereof. The second end 1340 of the seal ring also has a platform 1345 in a radially inward portion of the central region thereof, the platform extending circumferentially beyond the base 1348 of the fingers 1345 and being accessible from a radial outward side of the central region of the second end. Here, too, the platform is not formed by a separate shoulder of material as in the embodiment of FIGS. 9-12, but rather by the extension of the overall slanted shape of the material between the fingers. In the embodiment of FIGS. 13-17, the platform 1346 of the second end and the radially inward face of extension 1337 of the blade 1336 of the first end are formed at an angle that about 60 degrees from horizontal.

When the first end is engaged with the second end, for example, when the seal ring is packaged for shipment or is installed around a shaft, at least a portion of the extension 1337 of the blade 1336 of the central region of the first end that extends beyond the platforms of the lateral regions of the first end is disposed radially directly over the platform 1346 of the central region of the second end. This blocks the first end from moving radially inward with respect to the second end, and blocks the second end from moving radially outward with respect to the first end. And at least a portion of the fingers 1335 of the lateral regions of the second end are disposed radially directly over a platform 1345 of a lateral region of the first end. This blocks the first end from moving radially outward with respect to the second end, and blocks the second end from moving radially inward with respect to the first end. Finally, the blade 1336 of the central region of the first end is disposed between the fingers 1335 of the lateral regions of the second end. This blocks the first end and the second end from moving laterally with respect to one another. While the slanted parts of the central regions of the first and second end are shown in this embodiment as stopping before reaching the radially inward portions thereof, in other embodiments they can extend into the radially inward portions.

As noted above, the extension of the blade of the central region of the first end beyond the platforms thereof and the extension of the platform of the central region of the second end beyond the base of the fingers thereof can help block one type of radial deformation. The person of ordinary skill in the art will, based on the disclosure herein, select an amount of extension of the blade of the first end and of the platform of the second end to provide a desired degree of blocking, without otherwise compromising seal performance. For example, in certain embodiments of the seal rings as otherwise described herein, the blade of the first end extends at least 0.25 mm beyond, at least 0.5 mm beyond, 1 mm beyond, at least 2 mm beyond, or even at least 3 mm beyond the platforms of the first end, e.g. in the range of 0.25-8 mm, or 0.25-4 mm, or 0.25-2 mm, or 0.5-8 mm, or 0.5-4 mm, or 0.5-3 mm, or 1-8 mm, or 1-6 mm, or 1-4 mm, or 2-8 mm, or 2-6 mm, or 2-4 mm. The distance of the extension of the blade in the embodiment of FIGS. 9-12 is indicated by reference numeral 939 in FIG. 11, and the distance of the extension of the blade in the embodiment of FIGS. 13-17 is indicated by reference numeral 1339 in FIG. 16. Similarly, in certain embodiments of the seal rings as otherwise described herein, the platform of the second end extends at least 1 mm beyond, at least 2 mm beyond, or even at least 3 mm beyond the base of the fingers, e.g. in the range of 1-18 mm, or 1-12 mm, or 1-6 mm, or 1-4 mm, or 2-18 mm, or 2-12 mm, or 2-6 mm, or 2-4 mm, or 3-18 mm, or 3-12 mm, or 3-6 mm. The distance of the extension of the platform of the second end in the embodiment of FIGS. 9-12 is indicated by reference numeral 949 in FIG. 11, and the distance of the extension of the blade in the embodiment of FIGS. 13-17 is indicated by reference numeral 1349 in FIG. 16.

As noted above, when the ends are engaged, the extension of the blade of the central region of the first end is disposed radially directly over the platform of the central region of the second end; and the fingers of the lateral regions of the second end are disposed radially directly over the platforms of the lateral regions of the first end. In certain embodiments of the seal rings as otherwise described herein, and as shown in FIG. 11, the extension of the blade of the central region of the first end is disposed in contact with the platform of the central region of the second end. This can allow for complete blocking of radial motion in one relative direction. Similarly, in certain embodiments of the seal rings as otherwise described herein, and as shown in FIG. 12, the fingers of the lateral regions of the second end are disposed in contact with the platforms of the lateral regions of the first end. This can allow for complete blocking of radial motion in the other relative direction.

However, in certain cases, it is not necessary to provide for complete blockage, as long as a radial deformation cannot be so severe as to cause a plastic deformation. And in some cases, it may be desirable to allow for a little bit of radial motion of the ends with respect to one another. Accordingly, in certain embodiments of the seal rings as otherwise described herein, the extension of the blade of the central region of the first end is disposed within 2 mm, within 1 mm, or even within 0.5 mm of the platform of the central region of the second end. Similarly, in certain embodiments of the seal rings as otherwise described herein, the fingers of the lateral regions of the second end are disposed within 2 mm, within 1 mm, or even within 0.5 mm of the platforms of the lateral region of the first end.

The outer circumferential face of the seal ring desirably has a low surface roughness, so as to provide an adequate seal against an inner circumferential face of a housing or bore. Of course, as the person of ordinary skill will appreciate, some roughness resulting from conventional manufacturing processes can be acceptable. Because the first and second lateral faces are typically specified as sealing faces as described above, in certain desirable embodiments they also desirably have a low surface roughness. And as the person of ordinary skill in the art will appreciate, the presence of larger features formed as depressions in a face (e.g., fluid-handling grooves) is not considered to impact the surface roughness of the face; rather, it is sufficient for the sealing portion of the face to have a low surface roughness.

As the person of ordinary skill in the art will appreciate, the seal rings described herein can be made in a variety of sizes, depending on the particular parameters (e.g., shaft size, groove size, housing or bore inner diameter) of the system in which it is to be installed. For example, the seal rings described herein can be made having a variety of inner circumferences, for use with rotating shafts of a variety of sizes. in certain embodiments of the seal rings as otherwise described herein, the inner diameter (e.g., the diameter of the inner circumferential face) is in the range of 5 mm to 200 mm, e.g., 5-150 mm, or 5-100 mm, or 5-80 mm, or 5-50 mm, or 10-200 mm, or 10-150 mm, or 10-100 mm, or 10-80 mm, or 10-50 mm, or 20-200 mm, or 20-150 mm, or 20-100 mm, or 20-80 mm, or 20-50 mm.

Similarly, the seal rings described herein can be made having a variety of widths, to be fit into grooves variety of sizes. in certain embodiments of the seal rings as otherwise described herein, the width of the seal ring from the first lateral face to the second lateral face thereof is in the range of 1 mm to 20 mm, e.g., 1-10 mm, or 1-8 mm, or 1-6 mm, or 1-4 mm, or 2-20 mm, or 2-10 mm, or 2-8 mm, or 2-6 mm, or 2-4 mm, or 4-20 mm, or 4-10 mm, or 4-8 mm, or 6-20 mm, or 6-10 mm.

Figure 18:
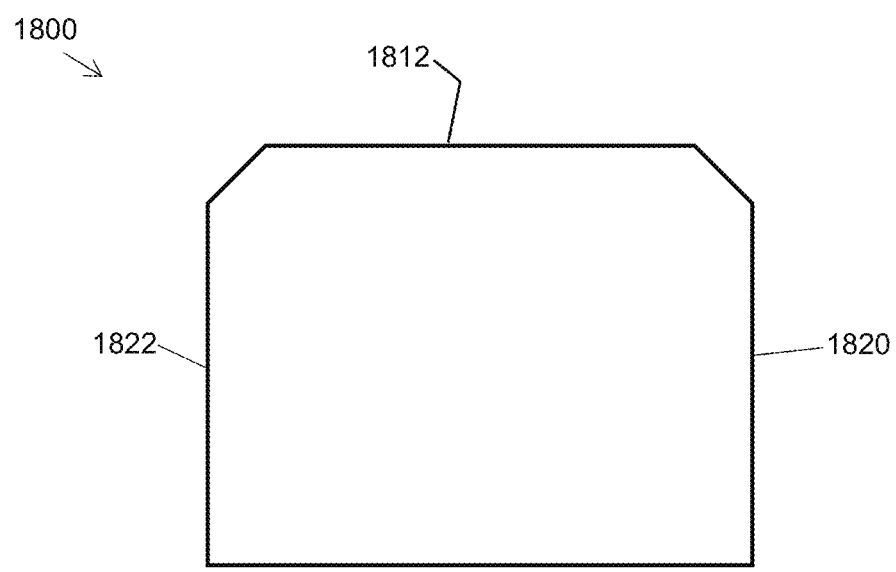
FIG. 18 is a cross-sectional schematic view of a seal ring according to another embodiment of the disclosure.
Figure 19:
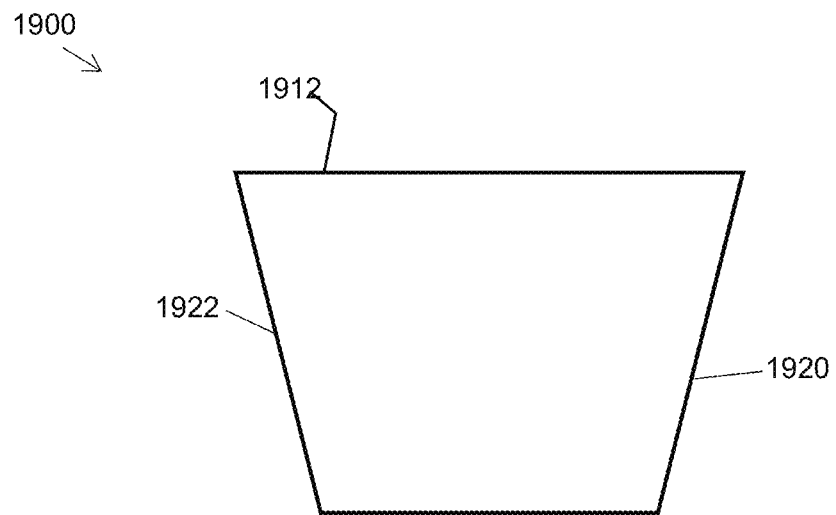
FIG. 19 is a cross-sectional schematic view of a seal ring according to another embodiment of the disclosure.
Figure 20:
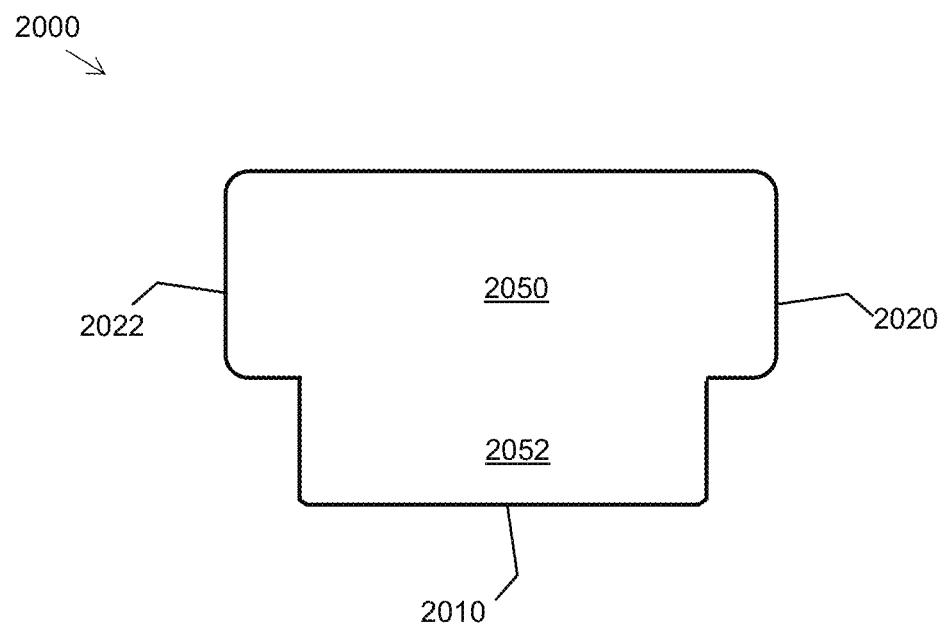
FIG. 20 is a cross-sectional schematic view of a seal ring according to another embodiment of the disclosure.

As the person of ordinary skill in the art will appreciate, the seal rings described herein can be formed with a variety of cross-sectional shapes. For example, certain embodiments of the seal rings as otherwise described herein have a rectangular cross-sectional shape (i.e., at a position along the circumference of the seal ring that does not include the features described herein with respect to the first end and the second end). FIG. 18 is a schematic cross-sectional view of a seal ring 1800 having a substantially rectangular cross-section, with the first lateral face 1820 being substantially parallel to the second lateral face 1822. In other embodiments of the seal rings as otherwise described herein, the seal ring has a substantially trapezoidal cross-section. FIG. 19 is a schematic cross-sectional view of a seal ring 1900 having a substantially trapezoidal cross-section, with the first lateral face 1920 and second lateral face 1922 being canted from the normal to the outer circumferential face 1912 by substantially the same angle. In other embodiments of the seal rings as otherwise described herein, the seal ring has a cross-sectional shape having a first rectangular section at the outer end thereof and a second, narrower rectangular section at the inner end thereof. FIG. 20 is a schematic cross-sectional view of a seal ring 2000 having such a cross-section. Here, the first lateral face 2020 and the second lateral face 2022 are sealing faces disposed at either end of the first rectangular section 2050, with second rectangular section 2052 being disposed immediately adjacent first regular section 2050 and extending to the inner circumferential face 2010. Of course, the person of ordinary skill in the art will appreciate that other cross-sectional shapes may be used, depending, for example, on the particular geometry of a groove in which the seal ring is to be disposed. And the person of ordinary skill in the art will appreciate that the shapes described herein can include chamfers or rounded corners without substantially deviating from the described shapes. For example, the cross-sectional shape of FIG. 18 includes chamfered corners at the edges of the outer circumferential face 1812, but is nonetheless considered to be rectangular.

Figure 21:
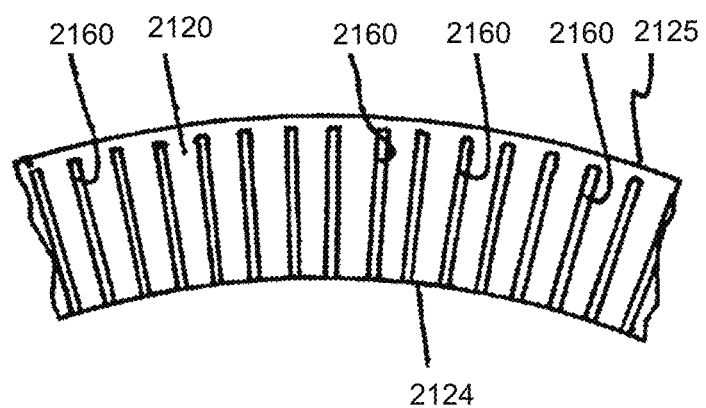
FIG. 21 is a schematic side view of a seal ring according to another embodiment of the disclosure.

A variety of additional features can be included in the seal rings described herein. For example, in certain embodiments of the seal rings as otherwise described herein, the first lateral face, the second lateral face, or both can include one or more grooves formed therein. Grooves can be configured, for example, to pull oil or other lubricant up along the lateral face, and thus help maintain sufficient oil between the lateral face and a groove sidewall, in order to maintain a sufficient seal between the groove sidewall and the lateral face. An example of such a seal ring is shown in partial schematic lateral side view in FIG. 21. In certain embodiments, none of the grooves formed in the lateral face extends from an outer end of the lateral face to an inner end of the lateral face. For example, in the embodiment of FIG. 21, the grooves 2160 extend to the inner end 2124 of the lateral end face 2120, but not to the outer end 2125 thereof.

As briefly noted above, the second end is engageable with the first end to provide a ring seal having a circular outer circumference.

Injection molding processes can be used to make the seal rings described herein from a variety of different materials. High-temperature thermoplastic materials are especially useful in the seal rings described herein. For example, certain embodiments of the seal rings as otherwise described herein are made from a material selected from a nylon (PA), polyphenylene sulfide (PPS), polyether ether ketone (PEEK), polyimide (PI), thermoplastic polyimide (TPI) and polyamide-imide (PAI). Such materials can be filled or unfilled.

Another aspect of the disclosure relates to a method for making a seal ring as otherwise described herein. The method includes providing a mold having a cavity having a shape that is the inverse of the shape of a seal ring as otherwise described herein, with an injection molding gate coupled to the cavity; injecting molten polymer into the cavity through the gate; allowing the polymer to harden; removing the seal ring from the mold and detaching it from a polymer runner at a surface of the seal ring. The person of ordinary skill in the art will use, in view of the description herein, conventional injection molding apparati and techniques in the practice of the methods described here.

The seal rings described herein find industrial use in a wide variety of rotating seal ring applications. For example, the seal rings described herein can be used in the clutch pack of a transmission for heavy equipment such as bulldozers and heavy duty trucks, as such seal rings can withstand pressure conditions as high as 400 psi, even under high rotational speeds. The seal rings described herein can be useful in a variety of types of apparati, including transmissions such as automatic transmissions, continuous variable transmissions, and dual-clutch transmissions, as well as in differentials and in camshaft adjustment.

Figure 1:
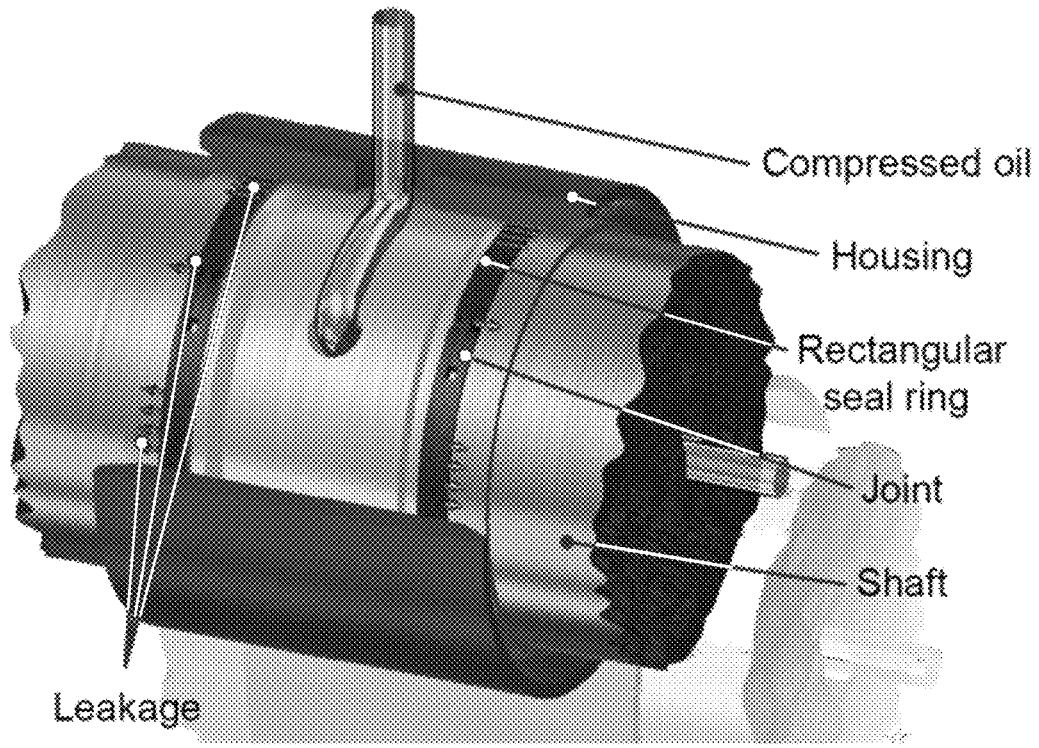
FIG. 1 is a schematic perspective view of a conventional rotating connection.
Figure 2:
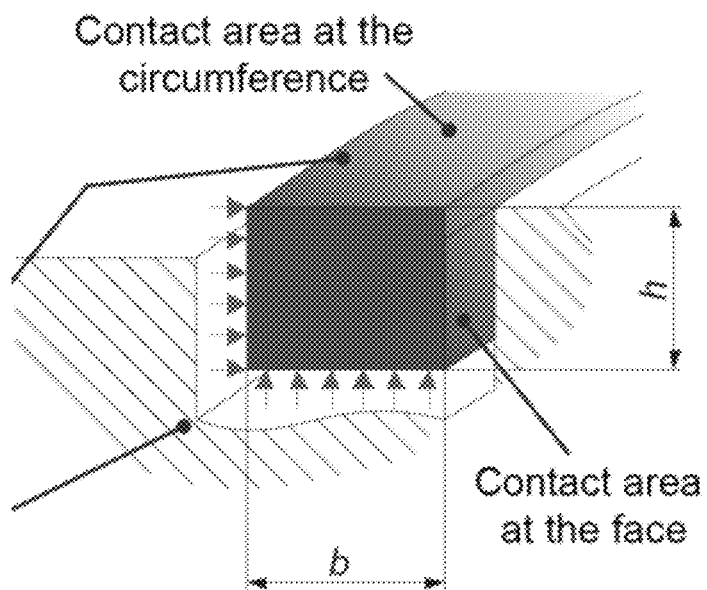
FIG. 2 is a schematic cross-sectional view of a seal ring assembly in the conventional rotating connection of FIG. 1.
Figure 3:
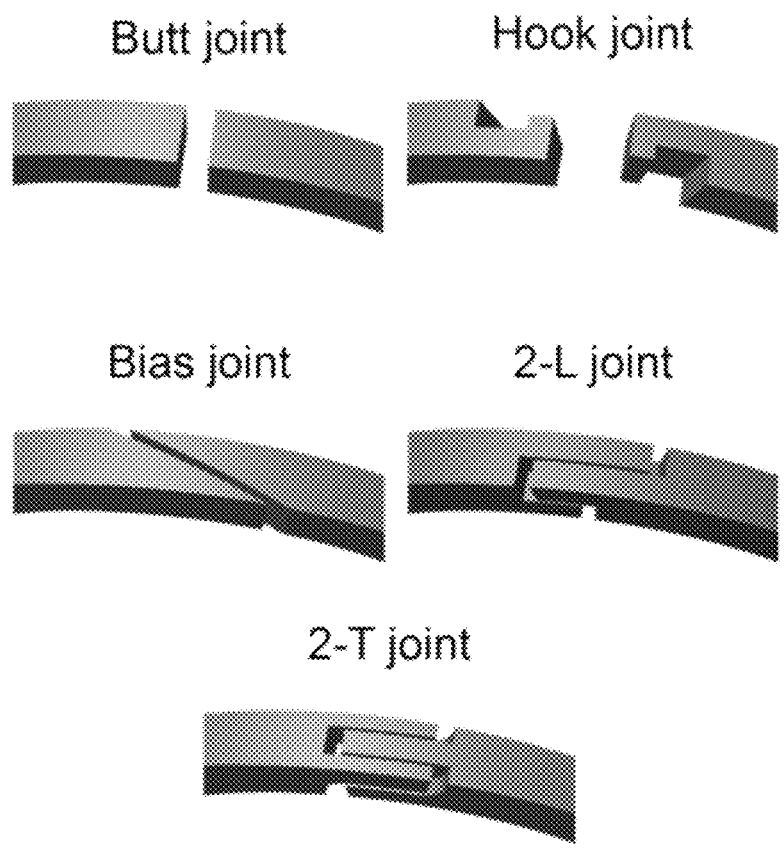
FIG. 3 is a set of perspective schematic views of different conventional arrangements for the first and second ends of a ring seal described with respect to FIGS. 1 and 2.

Accordingly, another embodiment of the disclosure is an apparatus comprising a rotating shaft, a seal ring as described herein disposed about the shaft, with its first lateral face and/or its second lateral face disposed against a sidewall of a groove associated with the rotating shaft; and a housing or a bore disposed about the shaft and the seal ring, such that the outer circumferential face of the seal ring is disposed against an inner circumferential face of the housing or bore. A lubricant such as oil can be disposed at the outer circumferential face and the sealing lateral face(s) of the seal ring to provide for complete sealing. This arrangement is shown above with respect to FIGS. 1 and 2, as described above. Notably, for the reasons described above, the presence of the injection molding gate vestige at the outer circumferential face of the seal ring does not substantially interfere with sealing of that face to the bore or housing, as it is disposed in the recess below the level of the outer circumferential face. And the recess does not substantially interfere with the sealing of the outer circumferential face to the housing or bore because it does not extend all the way through the width of the outer circumferential face.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A seal ring comprising a circular ring body extending between a first end and a second end engageable with the first end, the circular ring body comprising
   an inner circumferential face;
   an outer circumferential face opposing the inner circumferential face having a first lateral edge and an opposed second lateral edge;
   a first lateral face extending between the inner circumferential face and the opposing outer circumferential face; and
   a second lateral face opposing the first lateral face, disposed between the inner circumferential face and the opposing outer circumferential face;
   wherein
   the first end includes a central region and two lateral regions, one on each lateral side of the central region, and the second end of the seal ring includes a central region and two lateral regions, one on each lateral side of the central region, such that when the first end is engaged with the second end to provide a circular seal ring, the central region of the first end is laterally aligned with the central region of the second end;
   the first end includes a platform in a radially inward portion of each of the lateral regions thereof, and a vertically-extending blade in a radially outward portion of the central region thereof, the blade extending circumferentially beyond the platforms, forming an extension of the blade; and
   the second end including two vertically extending fingers in a radially outward portion of each lateral region thereof, and a platform in a radially inward portion of the central region thereof, the platform extending circumferentially beyond the base of the fingers and being accessible from a radial outward side of the central region of the second end; and
   wherein when the first end is engaged with the second end, at least a portion of the extension of the blade of the central region of the first end that extends beyond the platforms of the lateral regions of the first end is disposed radially directly over the platform of the central region of the second end, at least a portion of each of the fingers of the lateral regions of the second end is disposed radially directly over a platform of a lateral region of the first end, and the blade of the central region of the first end is disposed between the fingers of the lateral regions of the second end.

2. The seal ring according to claim 1, wherein the platform of the second end is formed as a substantially horizontal platform, with the radially inward face of the extension of the blade of the first end having a substantially horizontal mating surface.

3. The seal ring according to claim 1, wherein the platform of the second end and the radially inward face of the extension of the blade of the first end are formed on a slanted angle.

4. The seal ring according to claim 3, wherein the platform of the second end and the radially inward face of the extension of the blade of the first end are formed at an angle that is no more than 75 degrees from horizontal.

5. The seal ring according to claim 3, wherein the platform of the second end and the radially inward face of the extension of the blade of the first end are formed at angle that is no more than 60 degrees from horizontal.

6. The seal ring according to claim 1 wherein the blade of the first end extends in the range of 0.25-8 mm beyond the platforms of the first end.

7. The seal ring according to claim 1, wherein the platform of the second end extends in the range of 1-8 mm beyond the base of the fingers of the second end.

8. The seal ring according to claim 1, wherein the extension of the blade of the central region of the first end is disposed within 2 mm of the platform of the central region of the second end.

9. The seal ring according to claim 1, wherein the fingers of the lateral regions of the second end are disposed in contact with the platforms of the lateral regions of the first end.

10. The seal ring according to claim 1, wherein the fingers of the lateral regions of the second end are disposed within 2 mm of the platforms of the lateral regions of the first end.

11. The seal ring according to claim 1, having an inner diameter in the range of 5 mm to 200 mm.

12. The seal ring according to claim 1, having a width from the first lateral face to the second lateral face in the range of 1 mm to 20 mm.

13. The seal ring according to claim 1, having a substantially rectangular or substantially trapezoidal cross-sectional shape.

14. The seal ring according to claim 1, having a cross-sectional shape having a first rectangular section at the outer end thereof and a second, narrower rectangular section at the inner end thereof.

15. The seal ring according to claim 1, further comprising one or more grooves formed on the first lateral face, the second lateral face, or both.

16. The seal ring according to claim 15, wherein none of the grooves formed in the lateral face extends from an outer end of the lateral face to an inner end of the lateral face.

17. The seal ring according to claim 1, formed of a thermoplastic material selected from a nylon (PA), polyphenylene sulfide (PPS), polyether ether ketone (PEEK), polyimide (PI), thermoplastic polyimide (TPI) and polyamide-imide (PAI).

18. A method for making the seal ring according to claim 1, comprising providing a mold having a cavity, the cavity having a shape that is the inverse of the seal ring, with an injection molding gate coupled to the cavity;

injecting molten polymer into the cavity through the gate;

allowing the polymer to harden; and removing the seal ring from the mold and detaching it from a polymer runner at a surface of the seal ring.

19. An apparatus comprising a rotating shaft;

a seal ring according to claim 1 disposed about the rotating shaft, with its first lateral face and/or its second lateral face disposed against a sidewall of a groove associated with the rotating shaft; and a housing or a bore disposed about the shaft and the seal ring, such that the outer circumferential face of the seal ring is disposed against an inner circumferential face of the housing or bore.

20. The seal ring according to claim 1, wherein the first end is engaged with the second end to form a circular seal ring.

21. A seal ring comprising a circular ring body extending between a first end and a second end engageable with the first end, the circular ring body comprising an inner circumferential face;

an outer circumferential face opposing the inner circumferential face having a first lateral edge and an opposed second lateral edge;

a first lateral face extending between the inner circumferential face and the opposing outer circumferential face; and a second lateral face opposing the first lateral face, disposed between the inner circumferential face and the opposing outer circumferential face;

wherein the first end includes a central region and two lateral regions, one on each lateral side of the central region, and the second end of the seal ring includes a central region and two lateral regions, one on each lateral side of the central region, such that when the first end is engaged with the second end to provide a circular seal ring, the central region of the first end is laterally aligned with the central region of the second end;

the first end includes a platform in a radially inward portion of each of the lateral regions thereof, and a vertically-extending blade in a radially outward portion of the central region thereof, the blade extending circumferentially beyond the platforms, forming an extension of the blade; and the second end including two vertically extending fingers in a radially outward portion of each lateral region thereof, and a platform in a radially inward portion of the central region thereof, the platform extending circumferentially beyond the base of the fingers and being accessible from a radial outward side of the central region of the second end; and wherein when the first end is engaged with the second end, at least a portion of the extension of the blade of the central region of the first end that extends beyond the platforms of the lateral regions of the first end is disposed radially directly over the platform of the central region of the second end, at least a portion of each of the fingers of the lateral regions of the second end is disposed radially directly over a platform of a lateral region of the first end, and the blade of the central region of the first end is disposed between the fingers of the lateral regions of the second end, and wherein when the ends are engaged the extension of the blade of the central region of the first end is disposed in contact with the platform of the central region of the second end.

22. A seal ring comprising a circular ring body extending between a first end and a second end engageable with the first end, the circular ring body comprising an inner circumferential face having a first lateral edge and an opposed second lateral edge;

an outer circumferential face opposing the inner circumferential face having a first lateral edge and an opposed second lateral edge;

a first lateral face extending between the first lateral edge of the inner circumferential face and the first lateral edge of the opposing outer circumferential face; and a second lateral face opposing the first lateral face, extending between the second lateral edge of the inner circumferential face and the second lateral edge of the opposing outer circumferential face;

wherein the first end includes a first platform defining a first lateral region disposed along the first lateral face, the first platform being disposed in a radially-inward portion of the first lateral region, a second platform defining a second lateral region disposed along the second lateral face, the second platform being disposed in a radially-inward portion of the second lateral region, and a blade defining a central region between the first lateral region and the second lateral region, the blade being disposed in a radially outward portion of the central region, the blade extending circumferentially beyond the platforms, forming an extension of the blade; and the second end includes a first finger defining a first lateral region disposed along the first lateral face, the first finger being disposed in a radially-outward portion of the first lateral region, a second finger defining a second lateral region disposed along the second lateral face, the second finger being disposed in a radially-outward portion of the second lateral region, a platform defining a central region between the first lateral region and the second lateral region, the platform being disposed in a radially inward portion of the central region, the platform extending circumferentially beyond the base of the fingers and being accessible from a radial outward side of the central region of the second end;

wherein when the first end is engaged with the second end to provide a circular seal ring, the central region of the first end is laterally aligned with the central region of the second end, the first lateral region of the first end is laterally aligned with the first lateral region of the second end, and the second lateral region of the first end is laterally aligned with the second lateral region of the second end;

at least a portion of the extension of the blade of the central region of the first end that extends beyond the platforms of the lateral regions of the first end is disposed radially directly over the platform of the central region of the second end, at least a portion of each of the fingers of the lateral regions of the second end is disposed radially directly over a platform of a lateral region of the first end, and the blade of the central region of the first end is disposed between the fingers of the lateral regions of the second end.

\* \* \* \* \*